June 25, 1968  R. C. JAEGER  3,390,147

α-(THIENYL-2)-4-STILBENOL

Filed March 27, 1964

United States Patent Office 3,390,147
Patented June 25, 1968

3,390,147
α-(THIENYL-2)-4-STILBENOL
Roland Charles Jaeger, Mulhouse, Haut-Rhin, France, assignor to Societe Anonyme pour l'Industrie Chimique, Mulhouse-Dornach, Haut-Rhin, France
Filed Mar. 27, 1964, Ser. No. 355,304
Claims priority, application France, Nov. 20, 1963, 954,404
13 Claims. (Cl. 260—240)

ABSTRACT OF THE DISCLOSURE

New α-(thienyl-2)-4-stilbenols are provided which have the following formula

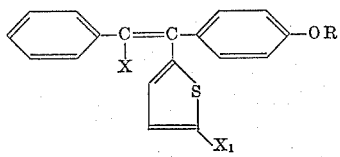

Figure 1:
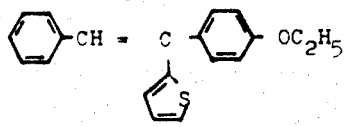

wherein X is selected from the group consisting of H and Br, $X_1$ is selected from the group consisting of H and Br, and R is selected from the group consisting of benzyl, acetyl, α-carboxylic aliphatic group of the formula $$CR_1R_2\text{---}CO_2H$$

and corresponding Zn salts thereof, and phosphorated group of the formula $PO(OR_3)(OR_4)$, $R_1$ and $R_2$ being selected from the group consisting of H and lower alkyl and $R_{13}$ and $R_4$ being selected from the group consisting of H, lower alkyl, phenyl and sodium.

---

This invention relates to α-(thienyl-2)-4-hydroxystilbene and a few derivatives thereof, these substances having the following formula:

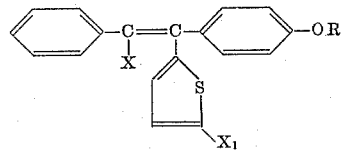

wherein
X=H or halogen (notably Br),
$X_1$=H or halogen (notably Br),
R=H or lower alkyl with at least 2 carbon atoms (for example $C_2H_5$) or arylalkyl (for ex.: $CH_2\text{---}C_6H_5$, or acyl (ex.: $COCH_3$), or an α-carboxylic aliphatic residue of formula $CR_1R_2CO_2H$ (ex.: $CH_2CO_2H$), and corresponding salts thereof or organic or inorganic bases (ex.: $CH_2CO_2Zn\frac{1}{2}$ or $CH_2CO_2ZnOH$), $R_1$ and $R_2$ being H or lower alkyls, or an acid or neutral phosphorated group, esterified or not, of formula $$PO(OR_3)(OR_4)$$

[ex.: $PO(OH)(OC_6H_5)$ or $PO(OH)(ONα)$], $R_3$ and $R_4$ being H or lower alkyls or aryls or metals.

These substances are novel per se and constitute notably new medicaments intended for the treatment of prostate diseases.

All these compounds determine an atrophic involution of the prostate gland in the male. Except those in which R=H, which are real oestrogens, all the others may be classified among the paraoestrogens but not among the oestrogens. The zinc derivatives, in addition to an atrophic involution of the prostate gland cause also a lysis of the prostate-forming tissues in general.

All the compounds of this invention (except the zinc derivatives for which the posology has not been determined so far) are efficient in amounts ranging from 0.10 to 0.40 gram, and preferably 0.25 gram, twice per day, during 90 to 100 days, in prostatic adenomas, the product being administered either by the oral route or by intramuscular injection (in oily solution).

All the compounds of this invention (except the zinc derivatives for which the tests are not complete at the date of the present application) are non-toxic. In amounts as high as 4 g./kg. by the intraperitoneal route or the oral route, it has not been possible to report any lethal case among the treated animals (Wistar albino rats). The prolonged administration (100 days) of 1 gram per kilogram of body weight per day does not bring about any disturbance nor any lesion except the atrophy of the prostate in the male and a dysmenorrhea in the female.

This invention is also concerned with the modes of preparing these products.

The derivatives of the above Formula I but wherein $R=CH_3$ and $X=X_1=H$ or Br have already been prepared and described by Buu-Hoï and Xuong (Rec. Trav. Chim. Pays-Bas, 69, 1,063–1,108 (1950), and J. Chem. Soc. (London, 1954, 1,690–1,696).

The derivatives with $R=C_2H_5$ or $CH_2C_6H_5$ may be prepared according to the Buu Hoï and Xuong method. According to this invention, these derivatives have also been obtained by ethylation or benzylation of α-(thienyl-2)-4-hydroxystilbene, followed by bromination step.

The derivatives with R=alkyl (ex.: $CH_3$ or $C_2H_5$) and $X=X_1=H$ were used as initial material for preparing α-(thienyl-2)-4-hydroxystilbene. The desalkylation step is effected by using a salt of an hydracid and an amine such as pyridine or quinoline hydrochloride.

The hydroxy group of α-(thienyl-2)-4-hydroxystilbene may be acylated according to conventional methods, whereafter two bromine atoms may be fixed provided however that the acyloxy group be stabilized by the addition, for example, of acid anhydride, during the bromination. After hydrolysis, α-(5-bromothienyl-2)-α'-bromo 4-hydroxystilbene is obtained.

The oxyacetic derivative was also prepared by reacting α-(thienyl-2)-4-hydroxystilbene with an α-halogenated acetic ester in the presence of a suitable agent for neutralizing the eliminated hydracid, such as alkaline alcoholates or alkaline carbonates. The ester thus formed is very easily hydrolyzed to yield α-(thienyl-2)stilbenyl-4-oxyacetic acid. By bromination, two carbon atoms of bromine are introduced and thus α-(5-bromothienyl-2)-α'-bromostilbenyl-4-oxyacetic acid is obtained, from which salts may be prepared with organic and inorganic bases. More particularly, two zinc salts, the neutral salt and the basic salt, have been prepared.

α-(thienyl-2)-4-hydroxystilbene may also be phosphorylated by reaction with $POCl_3$, $POCl_2(OR_3)$ or $POCl(OR_3)(OR_4)$ in the presence of an agent capable of fixing the hydracid released by the reaction, such as pyridine or quinoline.

$R_3$ and $R_4$ have the above-mentioned meaning. After hydrolysis, the corresponding phosphates or possibly the corresponding pyrophosphates are obtained, which have the following formula:

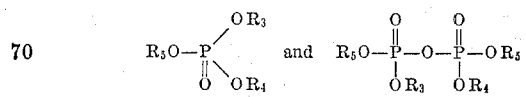

$R_5$ being the radical

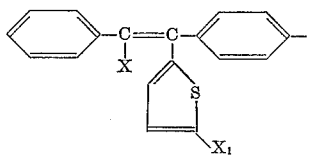

The following examples describe, by way of illustration and without limiting this invention, typical modes of preparation of the compounds of this invention.

Example 1.—α-(Thienyl-2)-4-ethoxystilbene
(FIGURE 1)

The Buu-Hoï et coll. synthesis method is adhered to by using 4-ethoxybenzoic acid as the initial material to produce the acid chloride which is subsequently condensed on thiophene. The resulting ketone is condensed on the magnesium organic compound of the benzyl chloride. The raw product is purified by distillation at 248–251° C. under 12 mm. Hg. It may be recrystallized in petrol ether. M.P.=78° C.

Remark: The same product may be obtained by ethylation of α-(thienyl-2)-4-hydroxystilbene (hereinafter described) with ethyl iodide or diethyl sulphate.

Figure 2:
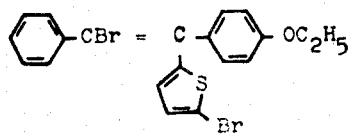

Example 2.—α-(5-bromothienyl-2)-α′-bromo-4-ethoxystilbene (FIGURE 2)

The bromination of the preceding product is effected with bromine in acetic acid as described by Buu-Hoï in connection with the methoxy derivative. The raw product is recrystallized in butanol. M.P.=124–125° C. This product is soluble in benzene, hot acetic acid and hot acetone. It gives a garnet-red coloration with concentrated sulfuric acid.

Figure 3:
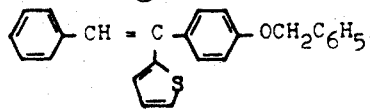

Example 3.—α-(Thienyl-2)-4-benzyloxystilbene
(FIGURE 3)

The synthesis is the same as that of the ethoxy derivative described in the preceding example, but the initial material is 4-benzyloxybenzoic acid. The raw product is distilled at 240–255° C. under 0.5 mm. Hg and gives a high-viscosity oil that does not crystallize.

Remark: The same product may be obtained by benzylation of α-(thienyl-2)-4-hydroxystilbene with benzyl chloride.

Figure 4:
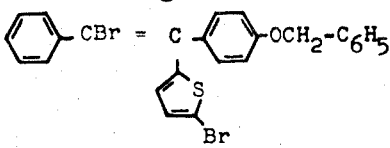

Example 4.—α-(5-bromo-thienyl-2)-α′-bromo-4-benzyloxystilbene (FIGURE 4)

The bromination of the preceding product is effected as in the case of ethoxy derivative. The pure product is crystallized and melts at 156° C. It is soluble in benzene, hot acetic acid and hot acetone. It gives a garnet-red coloration with concentrated sulfuric acid.

Figure 5:
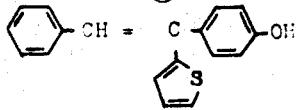

Example 5.—α-(Thienyl-2)-4-hydroxystilbene
(FIGURE 5)

A mixture consisting of 0.5 mole of α-(thienyl-2)-4-methoxy- (or 4-ethoxy-) stilbene and 2.5 moles of anhydrous pyridine hydrochloride is heated to 190° C. during two hours. After cooling the mixture is poured onto a water-ice bed and extracted with ether. The ether solution is extracted in turn by using a 5% sodium hydroxide solution which is subsequently acidified and extracted with benzene. The benzenic solution is concentrated and then chromatographed on alumina. The solution is then eluted with benzene. After the benzene has evaporated, a yellowish solid substance is obtained which is recrystallized in acetic acid. A yellow powder soluble in benzene, ether and alcohol is obtained with a 35% yield. With concentrated sulfuric acid, an intense brown-orange coloration is obtained. The pure product melts at 124–125° C.

Figure 6:
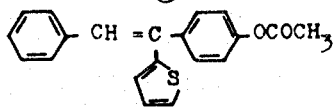

Example 6.—α-(Thienyl-2)-4-acetoxystilbene
(FIGURE 6)

0.2 mole of α-(thienyl-2)-4-hydroxystilbene dissolved in four volumes of acetic anhydride with 0.2 mole of sodium acetate is refluxed during 4 hours, and then the solution is poured onto a water-ice mixture, the precipitate being finally filtered. After recrystallization in ethyl alcohol, a crystallized, raw-wool colored product, soluble in benzene and acetic acid, is obtained. M.P.=128–129° C. Yield=90%.

Figure 7:
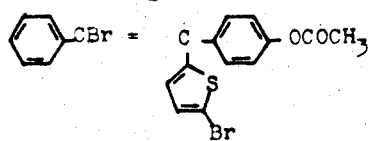

Example 7.—α-(5-bromothienyl-2)-α′-bromo 4-acetoxystilbene (FIGURE 7)

In a four-neck balloon flask 0.062 mole of α-(thienyl-2) 4-acetoxystilbene is dissolved in eight volumes of a 1:1 mixture of acetic acid and acetic anhydride. The solution is stirred, heated to 80° C. and nitrogen is caused to bubble therethrough. 0.124 mole of bromine dissolved in five volumes of acetic acid is added slowly. The precipitate is then cooled and filtered off. After recrystallization in acetic acid or alcohol a yellow crystallized product, soluble in benzene and acetone, is obtained. M.P.=143° C. Yield=45%. An intense violet-blue coloration is observed, with concentrated sulfuric acid. Analysis: found 33% Br (calculated: 33.5% Br for $C_{20}H_{14}O_2SBr_2$).

Figure 8:
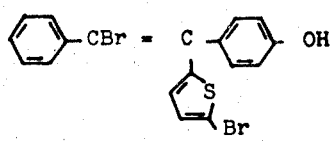

Example 8.—α-(5-bromothienyl-2)-α′-bromo-4-hydroxystilbene (FIGURE 8)

0.025 mole of α-(5-bromothienyl-2)-α′-bromo-4-acetoxystilbene is introduced into 80 c.c. of alcohol. The mixture is cooled to 0° C., strongly stirred and 40 c.c. of alcoholic potash are slowly introduced. The initial product solubilizes within one hour. The solution is diluted with water and the precipitate formed is filtered off. After recrystallization in acetic acid, a raw-wool colored powder, soluble in alcohol and benzene, is obtained. M.P.=151–152° C. Yield=85%. Concentrated sulfuric acid gives an intense brown-red coloration. Analysis: found 35.6% Br (calculated=36.7% Br for $C_{18}H_{12}OSBr_2$).

Figure 9:
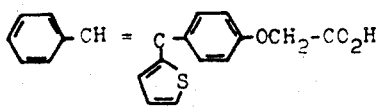

Example 9.—α-(Thienyl-2) stilbenyl-4-oxyacetic acid
(FIGURE 9)

0.01 mole of α-(thienyl-2)-4-hydroxystilbene and 0.011 mole of ethyl bromoacetate in solution in 100 c.c. of acetone in the presence of one mole of anhydrous potassium carbonate are refluxed during eight hours. The solution is allowed to cool, filtered and the acetone is evaporated. The remaining liquid is taken up by using 15 c.c. of 2% alcoholic potash, refluxed during one hour, allowed to cool; the potassium salt is filtered and washed with alcohol. The potassium salt is again suspended in water and acidified by using 5% hydrochloric acid, then the product is filtered and recrystallized in acetic acid. A white crystallized product soluble in benzene, hot water and hot methanol is obtained. M.P.=180° C. Yield=80%.

Figure 10:
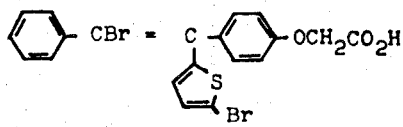

Example 10.—α-(5-bromothienyl-2)-α′-bromo stilbenyl-4-oxyacetic acid (FIGURE 10)

To a solution consisting of 0.04 mole of α-(thienyl-2) stilbenyl-4-oxyacetic acid in 100 c.c. of acetic acid cooled by using an iced-water bath, another solution consisting of 0.04 mole of bromine in 100 c.c. of acetic acid is added slowly while stirring and causing a nitrogen stream to bubble therethrough. The solution is allowed to rest during one hour and then filtered. By adding 20% of water, a second jet is obtained which is subsequently filtered. The two products are recrystallized in acetic acid.

A nearly white powder is obtained which is soluble in methanol and hot benzene and insoluble in water, M.P.= 173° C. Yield=80%. The use of concentrated sulfuric acid gives an intense brown-red coloration. Analysis: found 32% Br (calculated: 32.4% Br for $C_{20}H_{14}O_3SBr_2$).

Figure 11:
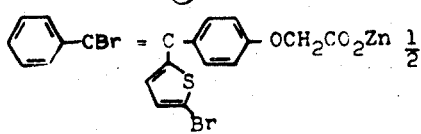

Example 11.—Zinc α-(5-bromothienyl-2) α′-bromostilbenyl-4-oxyacetate (FIGURE 11)

0.011 mole of α-(5-bromothienyl-2)-α′-bromostilbenyl-4-oxyacetic acid is dissolved in 200 c.c. of alcohol and refluxed. Within the next two-hour period 0.005 mole of zinc acetate is added under strong stirring. The mix is allowed to reflux during another hour and then the solution is filtered when hot and washed with boiling alcohol. The residue is 1 gram of a yellow powder insoluble in all organic solvents except dimethylformamide. Analysis: found 6.0% Zn (calculated=6.2% Zn for $C_{40}H_{26}O_6S_2Br_4Zn$).

Figure 12:
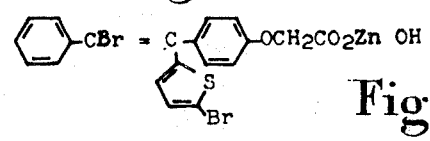

Example 12.—Basic zinc α-(5-bromothienyl-2)-α'-bromostilbenyl-4-oxyacetate (FIGURE 12)

0.011 mole of α-(5-bromothienyl-2)-α'-bromostilbenyl 4-oxyacetic acid is dissolved in 200 c.c. of boiling alcohol. To this solution 0.011 mole of zinc oxide is added by small fractions. Reflux is continued during one hour and the product is filtered and washed in succession with boiling water, a concentrated solution of ammonium chloride, boiling water and again boiling alcohol. A basic zinc salt is obtained which has the appearance of a slightly yellowish powder. Yield=90%. Analysis: found 28% Br and 12% Zn (calculated=27.8% Br and 11.4% Zn for $C_{20}H_{14}O_4SBr_2Zn$).

Figure 13:
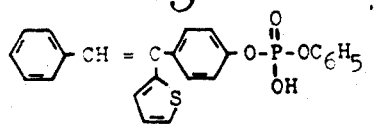

Example 13.—Phenyl-(α-thienyl-2-stilbenyl-4)phosphoric acid (FIGURE 13)

A 0.01-mole solution of phenyl dichlorophosphoric acid is charged with 0.03 mole of pyridine in 30 cc. of benzene and during one hour a solution of 0.012 mole of α-(thienyl-2)-4-hydroxystilbene with 0.01 mole of pyridine in 30 cc. of benzene is added. The solution is stirred during a complementary four-hour period while allowing the temperature to rise slowly to 20° C. The pyridine hydrochloride is filtered and the chlorinated derivative is hydrolysed with 80 cc. of 2 N ammonia. The phenyl-(α-thienyl-2-stilbenyl-4)phosphoric acid precipitates slowly. It is subsequently filtered, dried and recrystallized in anhydrous chlorobenzene or acetone. Thus, 1.4 g. of white powder soluble in acetic acid, dimethylformamide and hot water is obtained. Analysis: found 7 of phosphorus (calculated=7.13% P for $C_{24}H_{19}O_4SP$). By acidimetric titration in a 2:1 acetone/water mixture a molecular mass of 450 is found (theoretically=434). Remark: By varying the hydrolysis conditions considerable proportions of corresponding pyrophosphate develop:

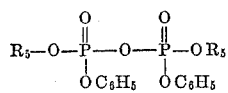

with $R_5$=α-thienyl stilbenyl.

Figure 14:
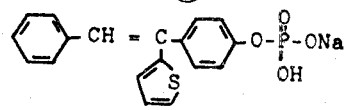

Example 14.—Monosodic (α-thienyl-2 stilbenyl-4)phosphate (FIGURE 14)

A solution consisting of 0.027 mole of phosphorus oxychloride and 0.05 mole of pyridine in 60 cc. of toluene is stirred and cooled to —12° C. Within one hour 0.026 mole of α-(thienyl-2)-4-hydroxystilbene and 0.026 mole of pyridine dissolved in 60 cc. of toluene are added. The mixture is stirred again during two hours at room temperature. The pyridine hydrochloride is filtered and the dichlorinated derivative is hydrolised with 120 cc. of a concentrated solution of sodium bicarbonate. The product gives a crystallized yellow precipitate. After filtration and drying 6 grams of product are obtained which are recrystallized in ethyl acetate and chlorobenzene. The pure product melts at 157–158° C. and is soluble in hot water and insoluble in benzene. Analysis: found 85% P (calculated: 8.15% P for $C_{18}H_{14}O_4SPNa$). By acidimetric titration in an acetone and water mixture, two acidities are actually found, of which one is salted but the molecular mass is too strong due to the presence of some pyrophosphate according to the formula:

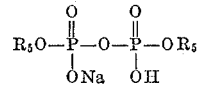

with $R_5$=α-thienyl stilbenyl.

What I claim is:
1. An α-(thienyl-2)-4-stilbenol of the formula

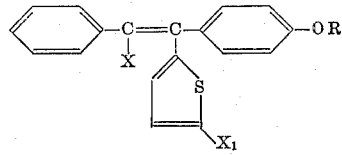

wherein X is selected from the group consisting of H and Br, $X_1$ is selected from the group consisting of H and Br, and R is selected from the group consisting of benzyl, acetyl, α-carboxylic aliphatic group of the formula $$CR_1R_2—CO_2H$$

and corresponding Zn salts thereof, and phosphorated group of the formula $PO(OR_3)(OR_4)$, $R_1$ and $R_2$ being selected from the group consisting of H and lower alkyl and $R_3$ and $R_4$ being selected from the group consisting of H, lower alkyl, phenyl and sodium.

2. α-(5-bromothienyl-2)-α'-bromo-4-ethoxystilbene.
3. α-(Thienyl-2)-4-benzyloxystilbene.
4. α-(5-bromothienyl-2)-α'-bromo-4-benzyloxystilbene.
5. α-(Thienyl-2)-4-acetoxystilbene.
6. α-(5-bromothienyl-2)-α'-bromo-4-acetoxystilbene.
7. α-(5-bromothienyl-2)-α'-bromo-4-hydroxystilbene.
8. α-(Thienyl-2)stilbenyl-4-oxyacetic acid.
9. α - (5 - bromothienyl - 2)-α'-bromostilbenyl-4-oxyacetic acid.
10. Zinc α-(5-bromothienyl-2)-α'-bromostilbenyl-4-oxyacetate.
11. Zinc (hydroxide)-α-(5-bromothienyl-2)-α'-bromostilbenyl-4-oxyacetate.
12. Phenyl (α-thienyl-2-stilbenyl-4)phosphoric acid.
13. Monosodium (α-thienyl-2-stilbenyl-4)phosphate.

References Cited

Buu-Hoï et al.: J. Org. Chem. vol. 17, pages 350 to 357 (1952).

Buu-Hoï et al.: Rec. Trav. Chem. vol. 69, pages 1083–1084, 1088–1089 and 1103 (1950).

Buu-Hoï et al.: Bull. Soc. Chem. Biol., vol. 38, pages 223–230 (1956).

Gazave et al.: Bull. Soc. Chem. Biol., vol. 39, pages 1343–50 (1959).

Nam et al.: J. Chem. Soc., 1954, page 1694.

JOHN D. RANDOLPH, *Primary Examiner.*